United States Patent

Shipp et al.

[15] 3,643,101
[45] Feb. 15, 1972

[54] LASER MICROAPERTURE MEASUREMENT INSTRUMENT

[72] Inventors: John I. Shipp; Nathan E. Welch; Thomas D. Broadbent, all of Tullahoma, Tenn.

[73] Assignee: Laser Systems & Electronics, Inc., Tullahoma, Tenn.

[22] Filed: Jan. 7, 1969

[21] Appl. No.: 789,458

[52] U.S. Cl. ..................................250/216, 350/162, 356/156
[51] Int. Cl. ..................................................................G02b 5/18
[58] Field of Search...................350/162; 250/216; 356/156, 356/106, 159, 160, 164, 109, 110

[56] References Cited

UNITED STATES PATENTS

| | | | |
|---|---|---|---|
| 3,247,467 | 8/1962 | Geusic et al. | 331/94.5 |
| 3,518,007 | 6/1970 | Ito | 356/113 X |
| 3,435,239 | 3/1969 | Stålberg | 250/220 SDS |

OTHER PUBLICATIONS

German Printed Application 1,229,739, Dec. 1, 1966, Böhm and Eschbach, 356/159

Primary Examiner—James W. Lawrence
Assistant Examiner—D. C. Nelms
Attorney—Cushman, Darby & Cushman

[57] ABSTRACT

A method and apparatus for determining the diameter of roughly circular apertures by employing a laser to pass a beam of coherent light through the aperture whose diameter is to be measured so that a Fraunhofer diffraction pattern is produced. The Fraunhofer pattern is split by appropriate means and the two identical patterns thus produced each focused upon appropriate photodetectors. For a first reference photodetector the entire Fraunhofer pattern is allowed to be incident upon the reference photocell while for the second detector only part of the inner portion of the bright central area of the pattern known as the Airy Disc is detected. The ratio of the voltages produced by the two photocells is then a function of the diameter of the aperture through which the beam has passed and by appropriate circuitry an output signal related to that diameter can be produced.

14 Claims, 2 Drawing Figures

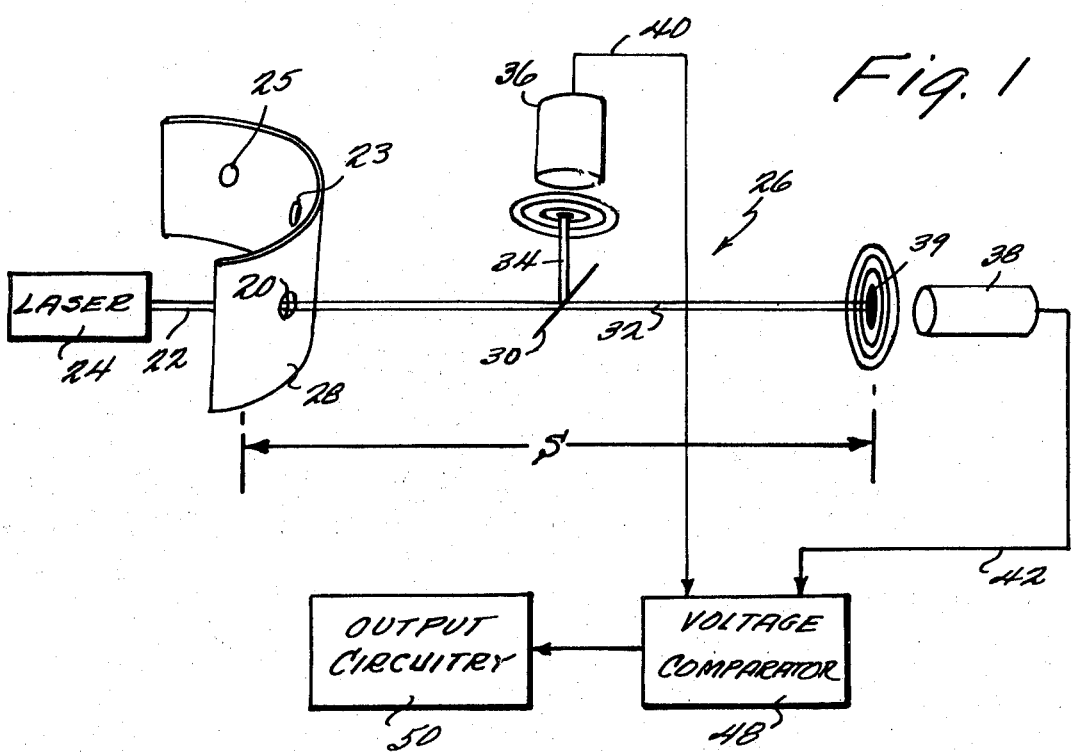
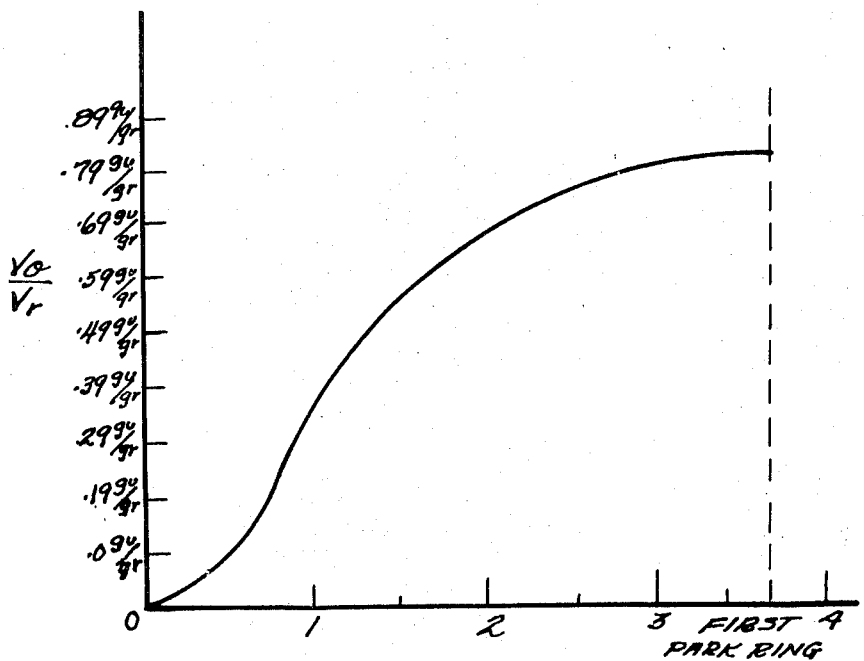

LASER MICROAPERTURE MEASUREMENT INSTRUMENT

BRIEF DESCRIPTION OF THE PRIOR ART AND SUMMARY OF THE INVENTION

The invention relates to a method and apparatus for determining the dimensions of holes or apertures.

Many different structures and devices used in a variety of ways, for a variety of diverse purposes employ apertures or holes located in various places on and within such devices or structures. Frequently, these apertures or holes must be produced with dimensions within narrow tolerances, in great numbers, and, often only a few microns in diameter. Manually monitoring and checking the dimensions and particularly the diameters of such apertures or holes, even when they are of relatively large size and reasonable number, is both a tedious and difficult chore which is both costly and time consuming. Moreover, when the apertures are extremely minute, and when great accuracy is required, the job surpasses the capabilities of a human inspector and has been, in the past, accomplished by or with the aid of complex and sophisticated devices. Not only are such devices extremely complicated and expensive, but, even with their use, it is often difficult to obtain the requisite accuracy and consistently to measure the dimensions of such apertures for a number of years without frequent and substantial errors.

One particular art in which the need to measure apertures quickly, easily and accurately is particularly acute in the manufacture of devices which produce synthetic fibers, fiberglas and other similar materials by rapidly spinning a bowl containing the molten material so that fibers are extruded through numerous extremely small holes in the bowl which ordinarily range in diameter from 10 to 90 microns. Since each of these bowls, or spinnerettes as they are sometimes referred to, frequently have from 40 to 200 or more roughly circular holes, and the diameter of each hole normally takes about 3 minutes to manually measure, the expense of checking the hole sizes alone is a substantial portion of the cost of the device.

The present invention relates to an aperture-measuring system which can quickly, easily and accurately measure the diameter of such holes, and which, in fact, can measure all of the holes in a spinnerette, as described above, in about 30 seconds simply by rotating the spinnerette head so that all the holes are sequentially presented to a stationary laser beam, or alternatively moving the laser beam so that it passes through each of the holes in turn.

The present invention employs a light beam such as the coherent and narrow beam produced by a conventional laser, passing the beam through the aperture being measured and thus producing the Fraunhofer diffraction pattern of that aperture which is then split and directed to each of two conventional photo detectors or photocells. In one photocell, the entire Fraunhofer pattern is received while in the other only the inner portion of the bright central area known as Airy Disc is received. By taking the ratios of the two voltages produced by the two photodetectors, the diameter of the aperture can be simply determined since it is the only variable in the mathematical relation between the two voltages which is not known.

Moreover, the novel apparatus of this invention is particularly simple, economical and reliable. Since all constants can be determined precisely, the determination of aperture size is quite precise. Further, the use of a reference voltage eliminates the intensity of light as a variable so that variation in the incident light does not effect the measurement.

Other objects and purposes of the invention will become clear after reading the following detailed description of the drawings.

BRIEF DESCRIPTION OF THE DRAWINGS

FIG. 1 shows the laser microaperture measurement device of this invention in use, with the laser beam passing through an aperture which is being measured.

FIG. 2 shows a graph of the ratio of the two voltages produced by the two photocells versus a function in which all the variables are known except the diameter $a$ of the microaperture being measured.

DETAILED DESCRIPTION OF THE DRAWINGS

Reference is now made to FIG. 1 in which a roughly circular microaperture 20 of diameter $a$ and in a device 28, such as a spinnerette with most of its surface removed to show the operation of this invention, is being measured by the passage through aperture 20 of a laser beam 22, produced by a laser 24, to the detection circuitry 26. The aperture 20 may be in any suitable structure or device 28, and the device 28 may be rotating so that successive apertures such as apertures 20, 23 and 25 are presented to the beam 22. Alternatively, the aperture 20 of the device 28 may be simply manually placed and held stationary in line with the laser beam 22 during measurement. Any suitable means for rotating the device 28 can be employed.

As mentioned above, the laser measuring instrument shown in FIG. 1 has proved to be of particular value in measuring the diameters of the apertures of a spinnerette or jet, which is a device frequently employed in the synthetic fiber and fiberglass industries to produce fibers by extruding molten material from a rapidly rotating bowl or container through a large number of apertures having very small diameters, usually in the range from 10 to 90 microns. Since each of these apertures, which normally number from 40 to 200, must be individually checked when the device is manufactured to ensure that their diameters lie within predetermined tolerances, and since at least 3 minutes has previously been required to check each individual aperture or hole, an enormous amount of time has previously been invested in determining the diameters of these holes. By properly disposing the laser 24 and circuitry 26 with regard to such a bowl or container and then spinning the bowl or container so that each of the apertures is sequentially presented to the laser beam for measurement, the diameters of each of the holes can be rapidly checked in turn and in a very short time with this relatively simple and economical measuring device. Alternatively, the bowl may be held stationary and the laser 24 moved so as to successively pass through each of the apertures being measured.

The laser 24 which produces the beam 22 may be of any suitable type and no particular type of laser is intended for use. Although a normal source of incoherent light such as plain white light could possibly be employed with this invention, a laser is preferably used because of the radiance of its light and the narrow beam which it produces.

The passage of the laser beam 22 through the aperture 20 produces a diffraction pattern in a manner which is well known. Since the aperture 20 is roughly circular, the diffraction pattern produced is a Fraunhofer pattern consisting of a single bright central disc which is traditionally called Airy's Disc after the English scientist G. B. Airy, and a number of concentric outlying rings. The Fraunhofer pattern produced by passing a light beam through a circular aperture is discussed fully in a textbook received in the Scientific Library of the Patent Office on July 21, 1964 and entitled *PRINCIPLES OF OPTICS* by Max Born and Emil Wolf, and particularly on pages 392–397 therein.

As shown in FIG. 1, the laser beam 22, after passage through the aperture 20, strikes a beam splitter 30, which may be conventional, producing two split identical beams 32 and 34 which then are directed to photodetectors 36 and 38, respectively, which are also conventional and which convert the intensity of the light received into an amplitude of an electrical signal produced on an output line, the electrical signal from photodetector 36 being produced on line 40 and the electrical signal from photodetector 38 being produced on line 42.

While the total amount of energy contained in the Fraunhofer pattern does not vary directly with the size of the aperture, the distribution of that intensity with radius does vary. Further, the intensity of the pattern, and hence the energy content, at any given radius is a function, as developed below, of the diameter of the aperture through which the laser beam 22 has passed. Since the total energy is invariant with aperture diameter, the voltage amplitude produced by the photocell 36 which admits all of the energy in the entire Fraunhofer distribution can serve as a reference which is invariant with the aperture size. Actually since virtually all the energy is contained in the Airy Disc and the first three or four rings, the photodetector 36 need only receive the Airy Disc and the first three or four rings.

The photodetector 38 in contrast is normally designed to receive only a portion of the Fraunhofer disc and preferably, as described below, receives a circle centered at the center of the pattern and including roughly one-half of the Airy Disc. The portion received in FIG. 1 is designated as area 39. The intensity distribution and hence the total energy within this reduced area will therefore vary with the diameter of the aperture, as developed below, and will thus vary the amplitude of the output voltage on line 42. By comparing the amplitudes of the two voltages on lines 40 and 42 within the appropriate voltage comparator circuitry 48, which may be simple transistor or other circuitry or devices, an electrical or other signal which is a function of the diameter of the aperture 20 alone can be passed to the output circuit 50 which may then transform or develop the signal from the voltage comparator 48 in any appropriate manner. Also by comparing the voltages, the determination of aperture diameter is made independent of the intensity of the light.

The total energy within any given area of the Fraunhofer pattern which is within a circle with a radius at the center of the circular Fraunhofer pattern can be derived as follows.

Let $dE$ represent the energy contained between A and dA: Then, $$dE = I(x)dA = I(x)\beta d\beta d\theta$$

$$E(\delta) = \int_0^{2\pi}\int_0^{\beta_0} I(x)\beta d\theta = 4I_0 \int_0^{2\pi}\int_0^{\beta_0} \frac{J_1^2(x)}{x^2} \beta d\beta d\theta$$

$$= \frac{4I_0\lambda^2 S^2}{4\pi^2 a^2} \int_0^{2\pi}\int_0^{\beta_0} \frac{J_1(x)}{x^2}\left(\frac{2\pi a\beta}{\lambda}\right)d\left(\frac{2\pi a\beta}{\lambda}\right)d\theta$$

$$= \frac{I_0\lambda^2 S^2}{\pi a^2} \int_0^{2\pi}\int_0 \frac{2\pi a\beta o}{\lambda S} \frac{J_1^2(x)}{x} dx d\theta$$

$$= \frac{2I_0\lambda^2 S^2}{\pi a^2} \int_0 \frac{2\pi a\beta o}{\lambda S} \frac{J_1^2(x)}{x} dx$$

By applying the Bessel Function Recurrence formulas, $$E(S) = \frac{-I_0\lambda^2}{8\pi a^2} \int_0 \frac{2\pi a\beta o}{\lambda S} d\{J_0^2(x) + J_1^2(x)\}$$

$$= \frac{-I_0\lambda^2}{\pi a^2}\left\{J_0^2\left(\frac{2\pi a\beta o}{\lambda}\right) + J_1^2\left(\frac{2\pi a\beta o}{\lambda}\right) - J_0^2(o) - J_1^2(o)\right\}$$

$$= \frac{I_0\lambda^2}{\pi a^2}\left\{1 - J_0^2\left(\frac{2\pi a\beta o}{\lambda}\right) - J_1\left(\frac{2\pi a\beta o}{\lambda}\right)\right\}$$

the intensity function for Fraunhofer diffraction is written as follows:

$$\frac{I(x)}{I_0} = \left\{\frac{2J_1(x)}{x}\right\}^2$$

where
$I(x)$ = the intensity at positive $x$
$I_0$ = the intensity at $x\,o$
$x = 2a/s$
$a$ = diameter of aperture
$s$ = distance of aperture to the photocells $\sigma$ = radius of circle from the center of the Airy Disc to a position in the Fraunhofer diffraction under consideration
$\lambda$ = wavelength of the light beam
$E(x)$ = Energy contained in a ring between $\sigma=o$ and $\sigma=\sigma$
$\beta = \sigma/s$
$A$ = Area of photo detector opening
$J(x)$ = Bessel Functions This derivation is also set forth in the above mentioned PRINCIPLES OF OPTICS by Born and Wolf. Thus, at any given radius, the energy in the Fraunhofer pattern within a circle with that radius can be simply determined.

Further, it will be apparent that the voltage from the reference photodetector 36 which we shall call $V_r$ is equal to the energy E incident upon that photocell 36 which is in fact the entire energy of the Fraunhofer pattern times the gain of that photocell which we shall call $g_r$ so that:

$$V_r = g_r E$$

It is further apparent that the voltage produced by the photodetector 38 on line 42 is also a product of the energy $E(\delta o)$ which it receives within the reduced area of the pattern which it receives times the gain of that photocell which we shall call $g_l$. Thus, the ratio of $V_l$ to $V_r$ can be easily shown to be $g_l E(\delta o)$ divided by $g_r E$ and the ratio is thus:

$$\frac{V_l}{V_r} = \frac{g_l E(\delta_0)}{g_r E} = \frac{\frac{g_l I_0 \lambda^2}{\pi a^2}\left\{1 - J_0^2\left(\frac{2\pi a\beta o}{\lambda}\right) - J_1^2\left(\frac{2\pi a\beta o}{\lambda}\right)\right\}}{g_r E}$$

Further, since $I_0$ is equal to $E\pi a^2/\lambda^2$ $$\frac{V_l}{V_r} = \frac{g_l}{g_r}\left\{1 - J_0^2\left(\frac{2\pi a\beta o}{\lambda}\right) - J_1^2\left(\frac{2\pi a\beta o}{\lambda}\right)\right\}$$

From this equation, it can be seen that the only unknown is the letter $a$ which is the diameter of the microaperture, and thus the voltage ratio can be plotted against $a$ or more conveniently $2\pi a\beta_o/\lambda$ which is in effect $a$ multiplied by a constant.

The above equation which represents the ratio of the voltages on lines 40 and 42 is graphically represented in FIG. 2 with the voltage ratio plotted against the variable factor $2\pi a\beta_o/\lambda$. As can be seen from FIG. 2, if the horizontally plotted function $2\pi a\beta_o/\lambda$ is set by adjusting the distances shown in FIG. 1 so that the ratio $V_l/V_R$ is roughly equal to about 1:4, the relation of the ratio $V_l/V_R$ to $a$ is rougly linear and on a linear, steep portion of the curve, thus maximizing sensitivity and linear range for variations of $a$. For a 50-micron circular aperture, it has been found that the distance $s$ should be set to approximately 18 inches in order to obtain this ratio of about 1:4. Variations in $a$ of plus and minus 40 percent will now still lie well within this linear region and permit accurate determination of $a$.

It should be apparent from the graph of FIG. 2 that since the wavelength of the incident light $\lambda$ must be held as nearly constant as possible, a laser, such as laser 24, which produces a beam having a very narrow band width is particularly useful for this invention. Moreover, the accuracy of the aperture diameter determined depends on a knowledge of the exact wavelength $\lambda$ and the wavelength of the light produced by a laser is, of course, very precisely known. Improvement in fringe contrast when laser illumination is used instead of conventional light has already been observed on page 445 of a text entitled MODERN OPTICS by Earle B. Brown, received by the Scientific Library of the Patent Office on June 22, 1966.

The output circuitry 50 which serves to receive the signals from the voltage comparator 48 may be of any suitable type and may perform any functions desired. For example, it may be desirable to connect the output circuitry 50 to a tape punch or a warning light or the like, and include circuitry so that a warning is given only when an aperture whose size deviates from the standard by an amount greater than the tolerance provided is encountered. Alternatively, it may be desirable only to record the locations of such incorrect apertures as they are encountered so that they can be corrected later without terminating the measurement of other apertures. In short, any suitable output circuitry which converts the electrical output of the voltage comparator 48 into a form which facilitates human or machine monitoring of the microaperture diameters can be used.

Further, the novel device of this invention is not only extremely accurate and reliable, it is also economical to make and use and simple. Moreover, as mentioned above, it can be used to measure apertures individually or it can measure a number of apertures successively presented to the light beam, for example, by rotating a spinnerette. Even further, the results are not dependent upon the intensity of the light beam employed and variation of that intensity in no way effect the value of aperture diameter arrived at.

As mentioned above, although laser beams provide a practical and accurate source of light, the invention can be practiced with a conventional or other like source if desired. It should also be apparent that although the invention is especially useful for determining the diameter of microapertures, holes or apertures of any size which produce suitable diffraction patterns can be measured. Further, while in the example above roughly circular apertures are measured, the invention can also be used to measure dimensions in holes of any shape which produce appropriate diffraction patterns. Therefore, it should be apparent to one of ordinary skill in the art that many changes and modifications from the example set forth above are possible without departing from the spirit of the invention. Accordingly, the above invention is intended to be limited only by the scope of the appended claims.

What is claimed is:

1. Apparatus for determining the size of an aperture comprising,
    means for passing a beam of light through said aperture to produce a diffraction pattern, the distribution of energy in said pattern being a function of the size of said aperture,
    first signal-producing means for receiving said pattern with its energy distribution substantially undistorted and producing a signal having a characteristic which is a function of substantially all of the energy in said pattern,
    second signal-producing means for receiving a contiguous portion of said pattern with its energy distribution undistorted and for producing a signal having a characteristic which is a function of the energy of said pattern within a portion of said pattern less than the entire pattern, including means for preventing the remainder of said pattern from being received,
    means for receiving the beam of light which has passed through said aperture and directing said diffraction pattern in that beam to said first and second signal producing means with the energy distribution in said pattern substantially undistorted, and
    means for comparing the characteristics of the signals produced by the first and second signal-producing means to determine the size of said aperture.

2. Apparatus as in claim 1 including a source of coherent light for producing said beam of light.

3. Apparatus as in claim 2 wherein said source is a laser.

4. Apparatus as in claim 1 wherein said second signal-producing means receives a circular area of said pattern of a given radius located at the center of said pattern.

5. Apparatus as in claim 4 wherein said aperture is roughly circular, and said pattern is a Fraunhofer pattern comprising a central disc and a plurality of concentric rings.

6. Apparatus as in claim 5 wherein said second signal-producing means receives roughly half of said central disc.

7. Apparatus as in claim 1 wherein said signal-producing means are photodetectors and said signals are electrical.

8. Apparatus as in claim 4 wherein said directing means includes a beam splitter for directing said diffraction pattern to each of said detectors.

9. Apparatus as in claim 8 wherein said comparing means includes means for obtaining the ratio of the amplitudes of the electrical signals produced by said photodetectors.

10. Apparatus for measuring the diameter of a roughly circular microaperture comprising,
    laser means for producing a beam of light and passing said beam through said microaperture so that a Fraunhofer diffraction pattern, comprising a bright central disc and a plurality of concentric bright rings and having an energy distribution which is a function of the size of said microaperture, is produced,
    a first photocell for receiving said pattern and producing a first electrical output signal having an amplitude which is a function of substantially all of the energy within said pattern,
    a second photocell for receiving a contiguous portion of said pattern and producing a second electrical output signal having an amplitude which is a function of the energy within said contiguous portion received, the energy within said portion varying with the diameter of said microaperture,
    means for directing said pattern to said first and second photocells so that said patterns are received by said first and second photocells substantially undistorted, and
    means for comparing the amplitudes of said first and second signals to determine the diameter of said microaperture.

11. A method of determining the size of an aperture comprising the steps of,
    passing a beam of light through said aperture so that a diffraction pattern is formed,
    directing said diffraction pattern with its energy pattern substantially undistorted onto a first signal-producing means which produces a signal having a characteristic which is a function of substantially all of the energy of said diffraction pattern,
    directing said diffraction pattern onto a second signal-producing means so that said second signal-producing means receives only a contiguous portion of said pattern, the energy portion of said pattern being substantially undistorted, and produces a signal having a characteristic which is a function of the energy within said portion of said diffraction pattern, the energy within said portion being a function of the size of said aperture, and
    comparing said characteristics of said first and second signals to determine the size of said aperture.

12. A method of determining the size of a roughly circular microaperture comprising the steps of,
    producing a laser beam,
    directing said laser beam through said aperture,
    splitting said diffraction pattern to produce two patterns with the energy distribution substantially undistorted,
    directing the first of said two patterns onto a first photodetector which produces an electrical signal having an amplitude which is a function of substantially all of the energy within said diffraction pattern,
    directing a contiguous portion of the second of said two patterns onto a second photodetector which produces an electrical signal having an amplitude which is a function of the energy within said portion of said diffraction pattern, the energy within said portion being a function of the size of said aperture, and
    comparing the amplitudes of said electrical signals to determine the diameter of said aperture.

13. A method of measuring the diameters of a number of microapertures in a device comprising the steps of,
    producing a laser beam,
    presenting each of said number of microapertures successively so that said beam passes through each said aperture sequentially, thus producing a Fraunhofer diffraction pattern for each microaperture comprising a bright central disc and a plurality of concentric rings and having an energy distribution which is a function of the diameter of the microaperture through which the beam is passing, directing each said pattern with its energy pattern substantially undistorted onto a first photodetector which produces an electrical signal having an amplitude which is a function of substantially all the energy within said pattern, the energy within said portion being a function of the square of the diameter of the microaperture through which the beam is passing, and onto a second photodetector which produces a second electrical signal having an amplitude which is a function of the energy within a circular contiguous area of said pattern centered at the center of said portion being a function of the cube of the diameter of the microaperture through which the beam is passing, and comparing the amplitudes of the first and second signals produced for each microaperture through which said beam passes to measure the diameters of all of said number of microapertures.

14. A method as in claim 13 wherein said presenting includes the step of rotating said device.

* * * * *